M. M. MUELLER.
LOCK FOR STEERING MECHANISM.
APPLICATION FILED AUG. 24, 1916.

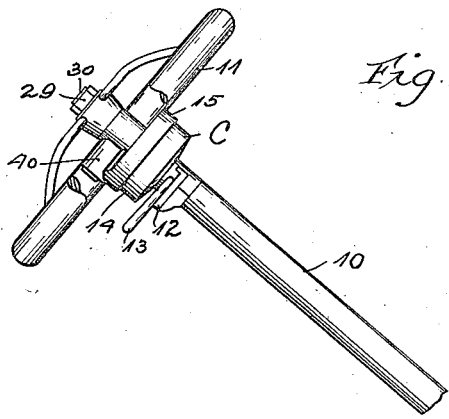
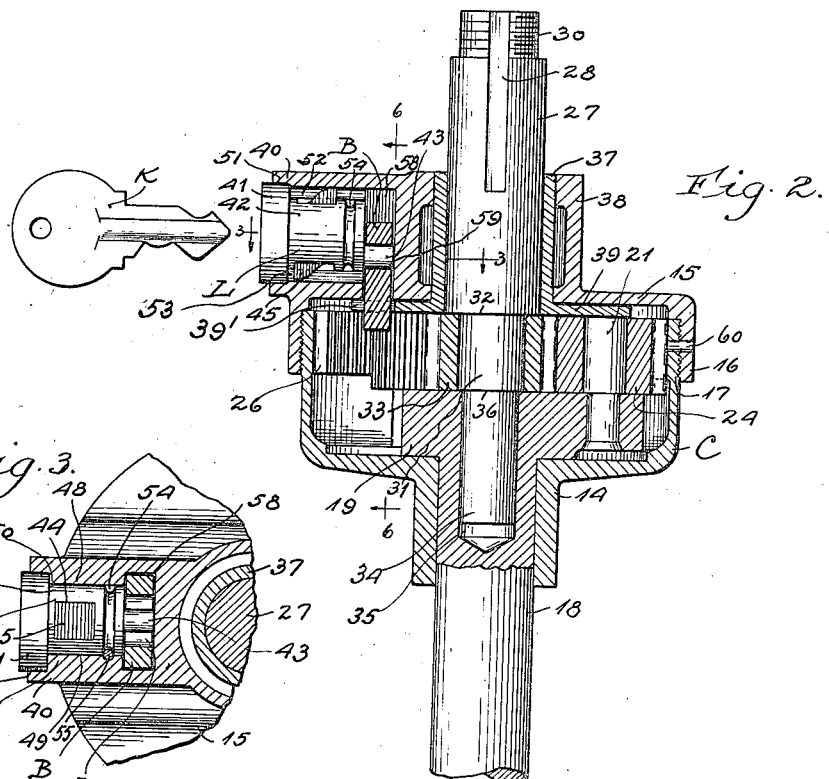
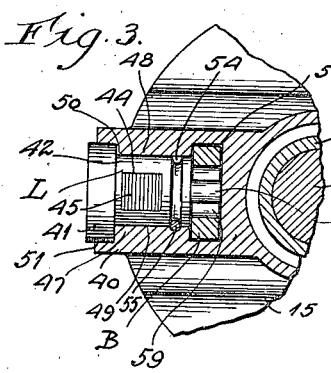

1,252,362.

Patented Jan. 1, 1918.
2 SHEETS—SHEET 2.

Inventor,
Max M. Mueller
By James R. Offield,
Atty.

UNITED STATES PATENT OFFICE.

MAX M. MUELLER, OF CHICAGO, ILLINOIS.

LOCK FOR STEERING MECHANISM.

1,252,362.  Specification of Letters Patent.  Patented Jan. 1, 1918.

Application filed August 24, 1916. Serial No. 116,585.

*To all whom it may concern:*

Be it known that I, MAX M. MUELLER, a citizen of the United States, and a resident of Chicago, in the county of Cook and State of Illinois, have invented certain new and useful Improvements in Locks for Steering Mechanism, of which the following is a specification.

My invention relates to steering mechanism and particularly to key controlled locking mechanism for positively locking the steering hand wheel and steering post of a motor vehicle against turning.

My invention is particularly adaptable for locking the steering hand wheel and post on Ford cars where the hand wheel shaft and steering post are coupled together by an epicyclic gearing train, such gearing train being within a housing mounted directly below the hand wheel and therefore readily accessible to the operator.

The object of the invention is to provide simple and efficient locking mechanism for locking the steering wheel shaft and the steering post positively and independently of the gears of the gearing train within the gearing housing.

On the accompanying drawings I have shown my invention applied to the steering mechanism of a car and in these drawings—

Figure 4:
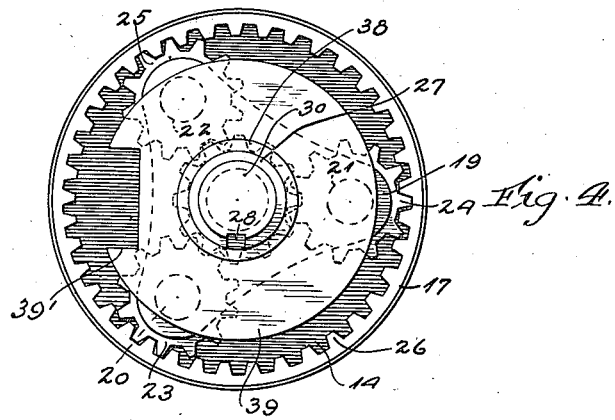
Figure 5:
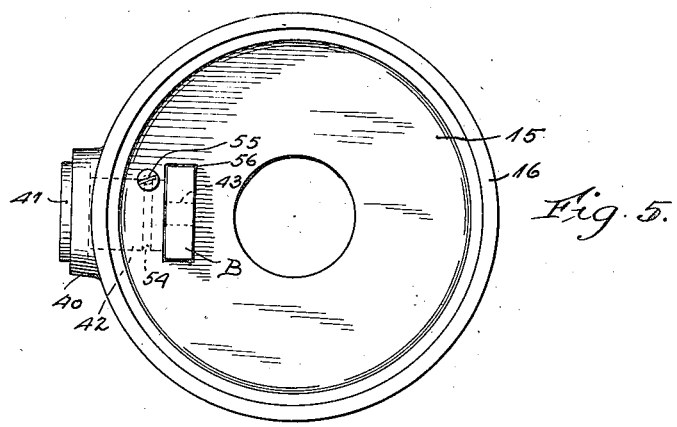
Figure 6:
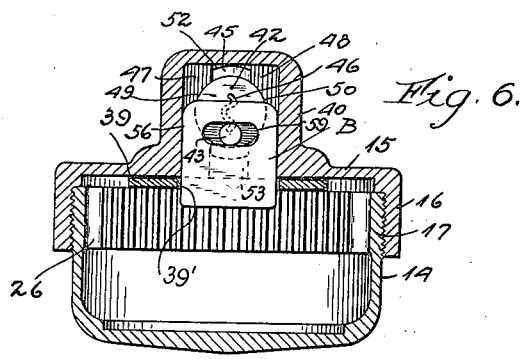

Figure 1 is a side elevational view of the upper end of the vehicle steering column and the gearing housing and hand wheel structure mounted thereon, Fig. 2 is an enlarged diametral sectional view through the gearing housing, the hand wheel being removed, the locking mechanism being shown in locking position, Fig. 3 is a sectional view on plane 3—3, Fig. 2, Fig. 4 is a plan view with the cover of the housing structure removed, Fig. 5 is a plan view of the inner side of the cover and Fig. 6 is a sectional view on plane 6—6, Fig. 2.

Referring to Fig. 1, 10 represents the steering column or tube at the upper end of which is secured the gearing case or housing C and above which is mounted the steering hand wheel 11, the rack 12 for the controlling levers 13 being mounted on the column below the case C.

The gearing case comprises the body 14 secured to the top of the steering column, and the cover 15 which has the threaded flange 16 for detachable engagement with the threaded flange 17 of the body. Extending through the steering column is the steering post or shaft 18, which at its lower end has an arm (not shown) connected with the link which leads to the steering spindle connecting rod of the vehicle. The shaft carries at its upper end the triangular frame 19 which seats on the bottom of the body 14. Extending upwardly from the corners of this triangular frame are the pivot pins 20, 21 and 22 for pivoting the gear pinions 23, 24 and 25, respectively. The inner side of the flange 17 of the body part is cut to provide the internal gearway 26 with which the pinions 23, 24 and 25 always mesh. Above the steering post 18 is the stub shaft 27 to whose upper end the steering hand wheel 11 is secured by suitable keys (not shown) engaging in key-way 28, and by a nut 29 engaging the threaded neck 30. The lower end of the wheel shaft 27 has the intermediate section 31 of reduced diameter to leave a shoulder 32 and on this section and against the shoulder is secured the gear 33 which meshes with the three pinions 23, 24 and 25. The end section 34 is of still further reduced diameter and extends into the bore 35 of the steering post 18 and has the shoulder 36 for abutting against the top of the pinion supporting frame 19. A sleeve 37 is secured to the stub shaft 27 above the shoulder 32 and the cover 15 has the upwardly extending guide sleeve 38 encircling and bearing against said sleeve 37.

In the usual arrangement in certain machines the sleeve 37 at its lower end has a narrow horizontal flange against which the cover seats to lock the shaft 27 in the housing, but for the purpose of my invention I provide a wider flange to produce the locking plate 39 overhanging the spaces between the pinions 23, 24, 25 and the gear 26. The plate at one side has the tangentially extending hole or notch 39' for receiving the lock bolt B of lock mechanism mounted on the cover 15.

As shown I provide a radially extending housing part or barrel 40 on the cover 15, which serves to receive lock cylinder mechanism L and the bolt member B. The cylinder mechanism shown is of familiar construction comprising the head 41, the cylinder 42 extending therefrom and the pin 43 extending from the end of the cylinder eccentrically with reference thereto. The cylinder 42 has a transverse pocket 44 for receiving the tumbler plate 45, this plate having apertures (not shown) which coöperate with the key slot 46 to receive a suitable key K. Extending inwardly from the opposite sides of the barrel 40 are guide projections 47 and 48 which have the opposed cylindrical pockets 49 and 50 for receiving the cylindric sides of the lock cylinder 42, the outer end of the barrel being bored to provide the cylindric pocket or seat 51 for the cylinder head 41. When the proper key is inserted into the cylinder key slot the tumbler plate will be drawn into the cylinder and the cylinder can then be turned as desired but as withdrawal of the key will tend to shift the tumbler plate into various positions of extent beyond the cylinder sides, the key can not be withdrawn until the cylinder has been rotated to bring the ends of its tumbler pocket 44 in registration with the gaps or spaces 52 and 53 between the walls 47 and 48. When the cylinder has been thus turned and the key withdrawn the end of the tumbler plate will project into these gaps and the walls 47 and 48 will prevent turning of the cylinder until the proper key has again been inserted and the tumbler plate withdrawn. To lock the cylinder against removal from the cover structure it is given the annular groove 54, and a pin or screw 55 is applied from the inside of the cover 15 to extend into said groove to thus lock the cylinder in the barrel 40 but to permit rotation thereof.

Behind the lock cylinder is the vertical pocket or guide space 56 for the bolt B. The bolt shown is a rectangular plate having the transverse slot 59 near its upper end into which extends the pin 43 on the lock cylinder 42 so that as the cylinder is turned the bolt will be raised and lowered in its guide pocket. Normally the bolt is up with its lower end above the locking plate 39, and the steering wheel and its shaft 27 can be freely turned, such turning being communicated by gear 33 to the pinions 23, 24, 25 which roll along the gear 26 and cause turning of the frame 19 and shaft 18 and steering adjustment of the vehicle wheels. When it is desired to lock the steering mechanism the steering wheel is turned until the hole or notch 39′ registers with the bolt B and one of the spaces between adjacent pinions on frame 19. The key is then turned to shift the bolt downwardly to project through the notch 39′. Any turning now of the steering wheel will be prevented by the engagement of the sides of the notch with the bolt, the cap supporting the bolt being rigidly screwed to the housing body 14 which is immovably fixed to the column 10 secured to the vehicle body. It will also be impossible to swing the vehicle wheels independently of the steering wheel as such movement effort is communicated by the gears to the plate 39 which is blocked by the bolt. It will be noted that the locking is entirely independent of the gears which cannot therefore be strained, stripped, or otherwise injured. As a precaution to prevent turning of the cap 15 on the body C one or more pins 60 may be inserted through the engaging flanges 16 and 17 of the cover and bead. Should such extraordinary power be applied to the steering wheel as would bend or shear these pins 60, the mechanism would still remain locked as upon any turning of the cap the bolt B will encounter one of the adjacent pinions 23, 24 or 25 and further turning will be prevented. Having three spaces between the gears into which the lock bolt can be inserted it is evident that the vehicle can be locked with its steering wheels at different angles. It is also evident that several notches 39′ can be provided in the plate 39 which will allow greater range of adjustment.

I do not desire to be limited to the exact construction and arrangement shown and described as modifications are no doubt possible which would still come within the spirit of the invention.

I claim as follows:

1. In mechanism for preventing operation of the steering mechanism of a vehicle, the combination with a two part stationary housing, a steering shaft extending through and journaled in the housing, a hand wheel on said steering shaft, a notched plate in said housing secured to said shaft, and a lock on one part of said housing having a bolt for entering a notch of the plate to lock the shaft directly to the housing and to prevent movement of one part of said housing relative to the other part.

2. In mechanism for locking a vehicle against steering, the combination of a two part stationary housing, a steering post extending into the housing, a hand wheel and a shaft extending therefrom into the housing, coupling mechanism within the housing for connecting the shaft with the post, a notched projection secured to the shaft, and a lock mounted on one part of the housing and having a bolt for coöperating with the notched projection to lock the shaft against turning in said housing and to prevent movement of one part of said housing relative to the other part.

3. In mechanism for locking the steering mechanism on an automobile, the combination of a two part stationary housing, a steering post extending from the housing, a hand wheel and a shaft extending therefrom into the housing, means within the housing for transmitting rotation of the shaft to the post, a plate within the housing rigidly secured to the shaft and having a hole therethrough, and lock mechanism on one part of said housing operable from the exterior thereof and having a bolt for passing through a hole in the plate to thereby lock the shaft against turning in the housing and to prevent movement of one part of said housing relative to the other part.

4. In mechanism of the class described, the combination of a two part stationary housing, steering shafts extending into said housing and a hand wheel on one of said shafts, means within the housing for transmitting the rotation of one shaft to the other, a notched plate within the housing secured to one of said shafts, and lock mechanism on one part of said housing operable from the exterior thereof and having a bolt for coöperating with the notched plate to lock the shafts against rotation in said housing and to prevent movement of one part of said housing relative to the other part.

In witness whereof I hereunto set my hand this 22nd day of August, A. D. 1916.

MAX M. MUELLER.